United States Patent [19]

Hoover

[11] 4,345,253

[45] Aug. 17, 1982

[54] PASSIVE SENSING AND ENCODING TRANSPONDER

[75] Inventor: D. Robert Hoover, Santa Cruz, Calif.

[73] Assignee: Identronix, Inc., Santa Cruz, Calif.

[21] Appl. No.: 161,622

[22] Filed: Jun. 20, 1980

[51] Int. Cl.³ .............................................. G01S 13/80
[52] U.S. Cl. ............................ 343/6.8 LC; 343/6.5 SS
[58] Field of Search .......... 343/6.5 SS, 6.8 R, 6.8 LC

[56] References Cited

U.S. PATENT DOCUMENTS

| | | | |
|---|---|---|---|
| 3,705,385 | 12/1972 | Batz | 343/6.8 R X |
| 3,754,250 | 8/1973 | Bruner | 343/6.8 R X |
| 3,944,928 | 3/1976 | Augenblick | 343/6.8 R X |
| 4,001,822 | 1/1977 | Sterzer | 343/6.8 R X |
| 4,040,053 | 8/1977 | Olsson | 343/6.8 R X |
| 4,075,632 | 2/1978 | Baldwin et al. | 343/6.8 R |
| 4,196,418 | 4/1980 | Kip et al. | 343/6.5 SS X |
| 4,242,663 | 12/1980 | Slobodin | 343/6.5 SS X |

Primary Examiner—T. H. Tubbesing
Attorney, Agent, or Firm—Townsend and Townsend

[57] ABSTRACT

A passive transponder for identifying objects remote to an interrogator includes an oscillator which generates a first frequency signal, a counter which divides the first frequency into a series of lower frequency signals, at least one multiplexer having a series of input terminals selected ones of which may be grounded to provide an identification code, and an encoder connected to the oscillator, the counter, the at least multiplexer, and an antenna for selecting which of the signals from the oscillator, counter, and at least one multiplexer shall be supplied to the antenna.

15 Claims, 12 Drawing Figures

PASSIVE SENSING AND ENCODING TRANSPONDER

BACKGROUND OF THE INVENTION

1. Field of the Invention

This invention relates to electronic circuitry, and in particular to a passive transponder, which when suitably activated by a transmitter, transmits an identification code and information pertaining to an analog parameter sensed by the transponder, and one or more digital parameters.

2. Prior Art

Numerous techniques are known in the art for detecting, counting, or identifying objects from a distance. One well-known class of such prior art devices relies upon optical detection of the objects being connected or identified. Well-known examples of such optical systems are the bar codes found on may household products which codes may be read by various automated techniques. Optical identification systems, however, require specified lighting conditions, and are subject to errors when the coded portion is not maintained in a clean condition.

Other techniques for counting or identifying objects at a distance utilize radio signals, however, many of these systems require an independent power supply for each object, thereby necessitating replacement of batteries or severe limitations on the type of objects which may be counted or identified. Also known in the art are solid state oscillators which are powered by incident radio frequency energy. Typically such devices have been expensive requiring high levels of transmitted power to drive the passive transponder. Other such devices have required various types of semiconductor memory for storing identification codes or other information, thereby making such transponders undesirably expensive or difficult to program in the field. Such transponders have also usually been of undesirably large size.

The present invention overcomes these disadvantages and provides an inexpensive small passive transponder operable at extremely low levels of incident radio frequency energy, and able to sense and relay desired analog and digital information concerning the environment in which it is situated, together with an identification code. The transponder of this invention may be simply programmed with an identification code in the field.

Typical prior art transponders are disclosed in U.S. Pat. No. 4,068,232 to Meyers and U.S. Pat. No. 4,075,632 to Baldwin et al.

SUMMARY OF THE INVENTION

In one embodiment, the passive transponder of this invention comprises an oscillating means for generating a signal of a first frequency; a counting means connected to receive signals from the oscillating means and provide output signals at selected frequencies integrally divisible into the first frequency; at least one multiplexing sequencing means having a series of input terminals to provide means of identification and data transmission; and an encoding means connected to encode input signals received from the oscillating means, the counting means, and the at least one multiplexing sequencing means, and connected to an antenna, the encoding means selecting which of said input signals shall be supplied to the antenna. Because the transponder operates on radio frequency energy absorbed by its antenna, no internal power supply is needed.

Some embodiments of the invention also include means for generating signals indicative of environmental conditions surrounding the passive transponder or a sensor attached thereto. In particular, some embodiments of the invention include a current controlled oscillating means for producing an oscillating signal having a frequency related to the current supplied to the oscillating means. In yet another embodiment of the invention, a reset control is provided for the counting means to ensure that when the system receives insufficient energy to operate properly from the radio frequency signals striking its antenna, no output signal is supplied to the antenna for transmission.

DETAILED DESCRIPTION

Figure 1:
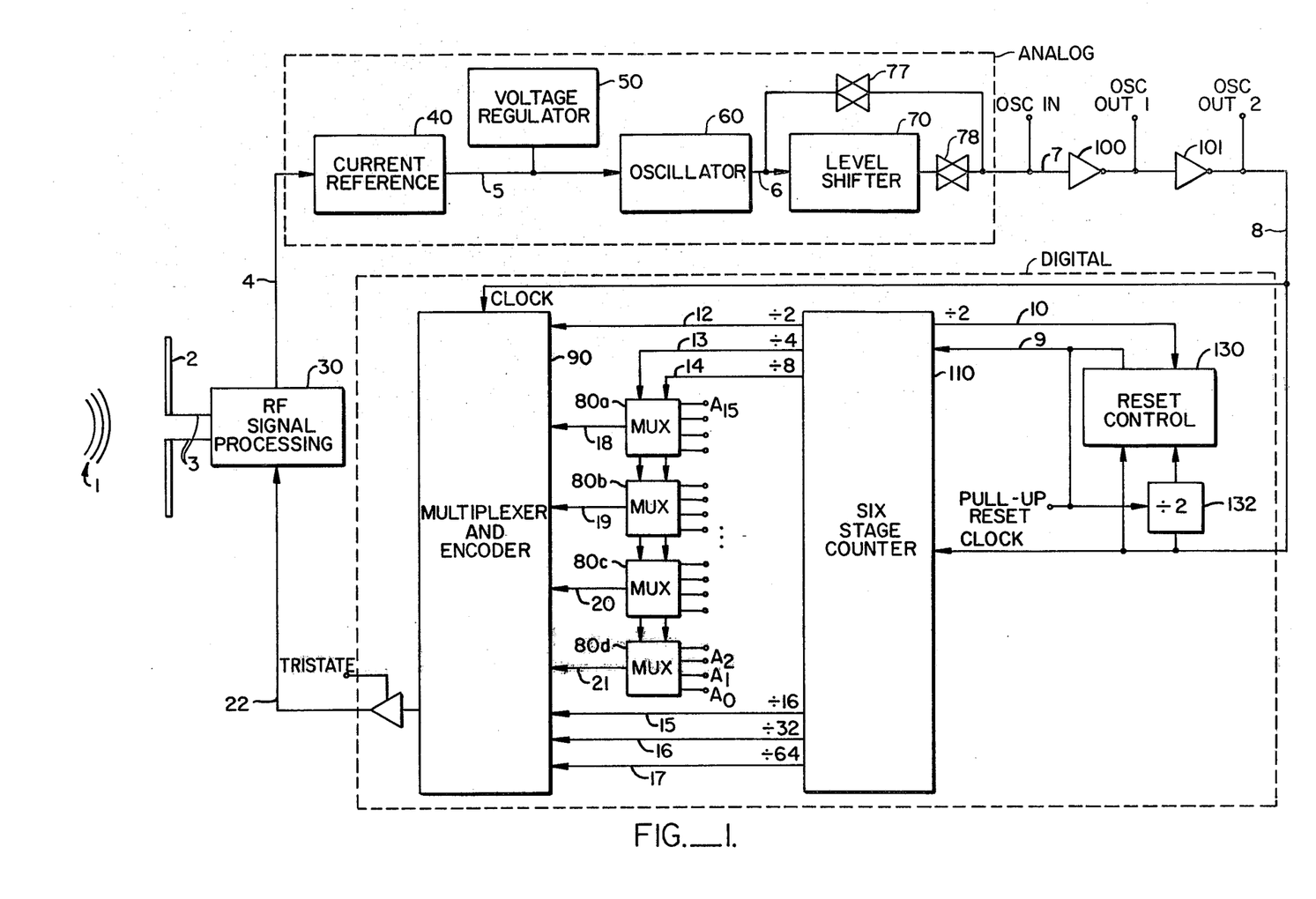
FIG. 1 shows a block diagram of the passive transponder of one embodiment of this invention.
Figure 2:
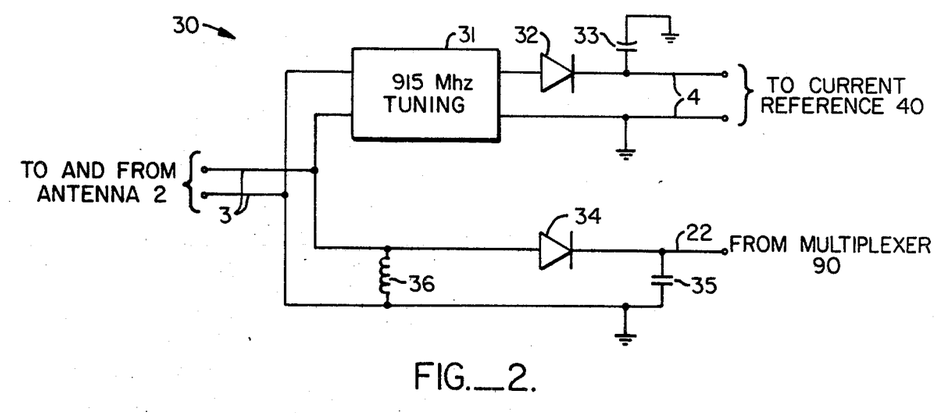
FIG. 2 is a more detailed description of the radio frequency signal processor utilized in FIG. 1.

A block diagram of the preferred embodiment of the passive transponder of this invention is shown in FIG. 1. More detailed schematics of the components shown in FIG. 1 are shown in FIGS. 2 through 9. As shown in FIG. 1, a signal 1 strikes antenna 2 which is tuned to a predetermined frequency which, in the preferred embodiment, is 915 Megahertz. The signal is transmitted by connections 3 to radio frequency signal processor 30. A more detailed view of radio frequency signal processor 30 is shown in FIG. 2. As shown there, the signal from antenna 2 is transmitted to an impedance matching circuit 31 which matches the 50–70 ohm impedance of antenna 2 to the much greater impedance presented by diode 32 and its load. Impedance matching circuit 31 also tunes out the capacity of diode 32. Diode 32 typically is a low threshold Schottky barrier type diode. Impedance matching circuit 31 is typically a series resonance structure, however, other well known equivalents may be substituted. Capacitor 33 is a feed through capacitor which acts to filter the RF signal on lines 4. The output from RF signal processor 30 is supplied on line 4 to the current reference generator 40 and acts as the power supply for the transponder.

Most of the block diagram shown in FIG. 1 may be considered as being divided into an analog portion and a digital portion. A dashed outline designates the extent of each of these portions of the transponder shown in FIG. 1. In the preferred embodiment the analog portion of the circuit shown in FIG. 1 functions to relay information about changes in temperature, while the digital portion encodes identification information on the temperature varying oscillator frequency and transmits this signal from antenna 2 to a remote receiver (not shown) where the signal may be detected and used. Although the analog parameter "temperature" is discussed herein, other analog parameters may be used in place of temperature. Further if temperature information is not desired, or where very low power or very low voltage signals are present, the analog portion of the passive transponder shown in FIG. 1 may be disconnected from the digital portion and another oscillator employed to allow use of the digital portion at lower power levels.

As shown in FIG. 1 the incoming signal from antenna 2 after passing through RF signal processor 30 is supplied on line 4 to current reference 40, which in turn supplies a signal to oscillator 60. A voltage regulator 50 is used to the stability of the signal generated by oscillator 60 on line 6. This signal is in turn supplied to a level shifter 70, through a potential two inverter oscillator comprising inverters 100 and 101, and to the digital portion of the circuit as a reference signal utilizing the unregulated power supply.

Figure 3A:
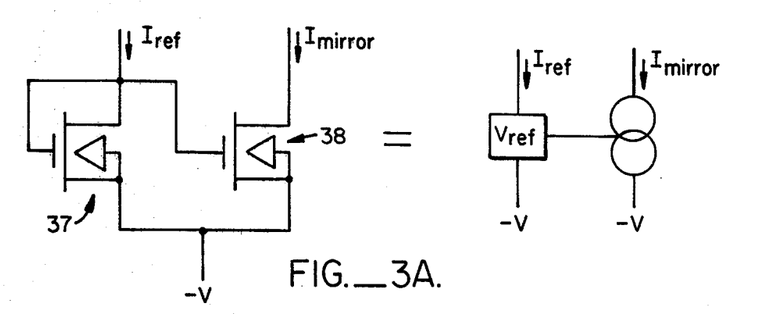
FIGS. 3A and 3B show a current mirror and a current source/sink as used in subsequent figures.
Figure 3B:
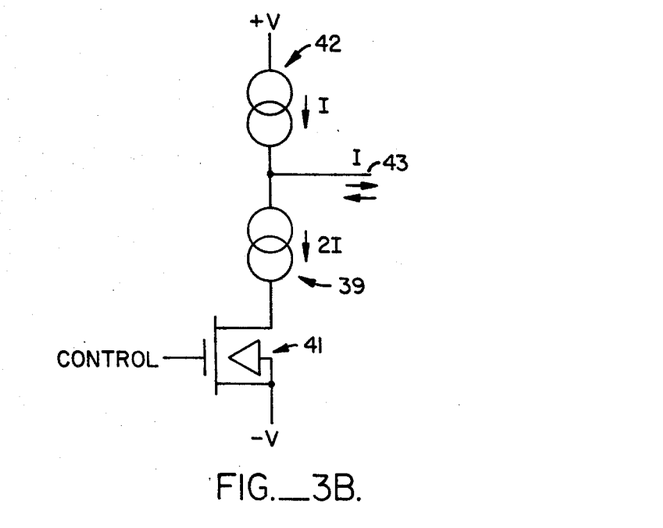

The basic structure of the analog portion of the block diagram of FIG. 1 comprises matched constant current sources and field effect transistors (FETs) in class A circuit configurations. The basic interconnections of FETs used to produce a current mirror, current source, or current sink is shown in FIGS. 3A and 3B. As shown in FIG. 3A a reference FET 37 accepts the reference current $I_{ref}$ and produces a gate voltage necessary for FET 37 to conduct the reference current. An identical FET 38 receives the same gate voltage, therefore conducting the same current, designated in FIG. 3A as $I_{mirror}$. A shorthand representation of these interconnected FET's shown on the left side of FIG. 3A is depicted on the righthand side of FIG. 3A.

A constant current source/sink device can be constructed with two constant current sources as shown in FIG. 3B. A double current source 39 may be switched by FET 41, pulling against a single current source 42. With the double source 39 off the single source 42 provides an output current I on line 43. With double source 39 on, a current I flows in the opposite direction on line 43.

Figure 4:
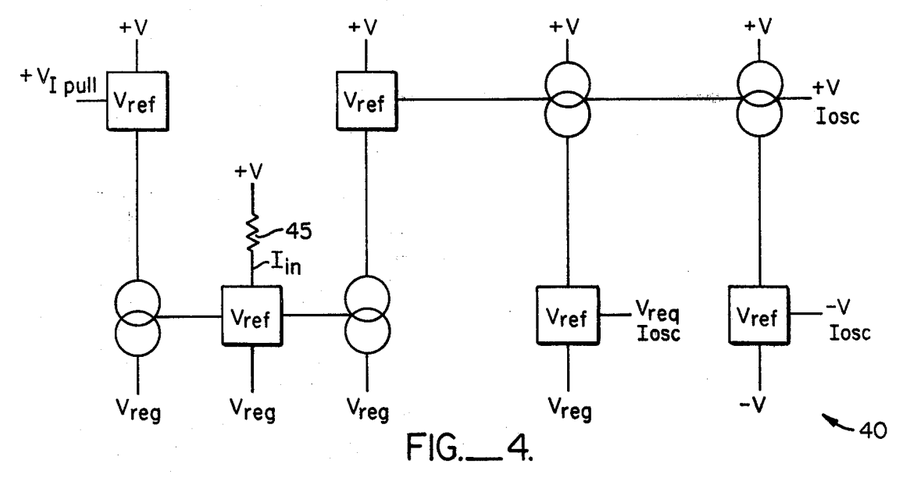
FIG. 4 is a more detailed schematic of the current reference 40 shown in FIG. 1.

Using the principles depicted in FIGS. 3A and 3B, a current reference 40 is constructed as shown in FIG. 4. Current reference 40 accepts a single reference current $I_{in}$ and generates reference voltages to make constant current sources from different polarities of field effect transistors at various voltage levels. It also generates a reference voltage for P type FETs at +V at one-half the reference current for the input pullup current sources. External connections at $+V_{Ipull}$ and $+V_{Iosc}$ allow these reference currents to be adjusted independently should a particular application of the passive transponder so require. The constant voltage between $I_{in}$ and +V allows a resistor 45 to be used as a constant current source.

Figure 5:
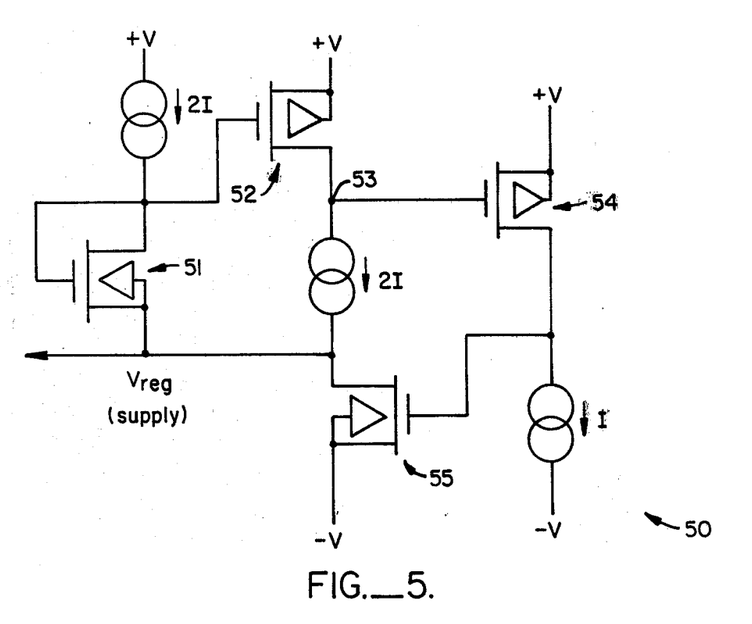
FIG. 5 is a more detailed schematic of the voltage regulator 50 shown in FIG. 1.

A more detailed schematic of voltage regulator 50 connected to current reference 40 by line 5 appears as FIG. 5. As shown in FIG. 5, the voltage regulator output $V_{reg}$ is referenced to +V. The basic reference element for the voltage regulator 50 is the sum of the gate voltages necessary for FET 51 and FET 52 to conduct a constant current. In the regulator shown in FIG. 5, the sum of the gate voltages of an N FET 51 and a P FET 52 each conducting twice the reference current is used. The resulting error voltage appearing on line 53 is amplified by P FET 54 and fed to the regulator "pass" device N FET 55.

Figure 6:
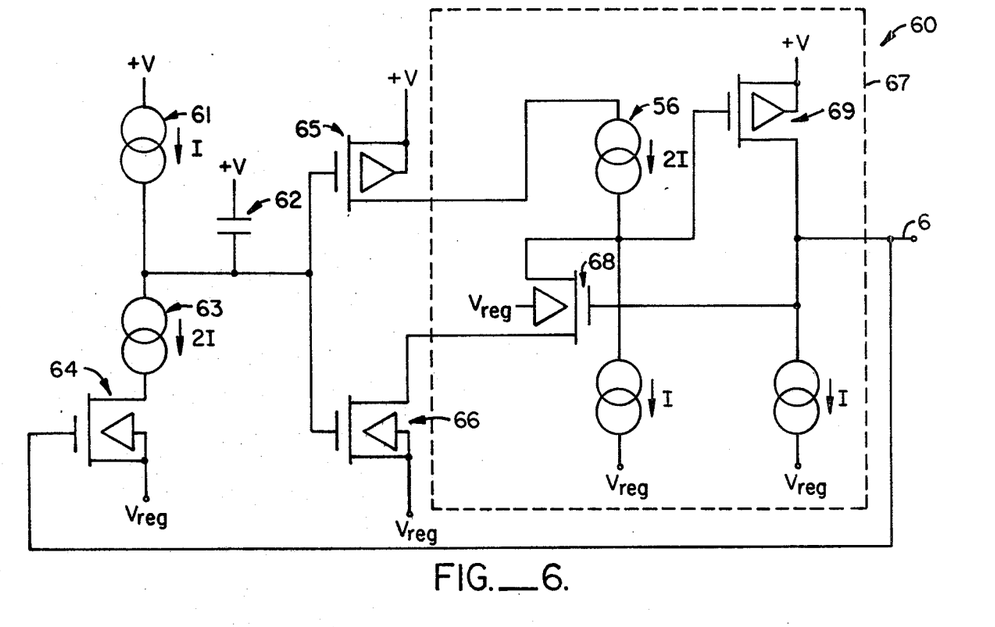
FIG. 6 is a more detailed schematic of the oscillator 60 shown in FIG. 1.

Oscillator 60, which accepts as input the output signal from current reference 40 on line 5, is shown in additional detail in FIG. 6. Oscillator 60 is an integrating oscillator consisting of a constant current source 61 charging and discharging a capacitor 62 between two voltage limits. The current source is composed of a single current reference from +V charging capacitor 62 and a double current sink 63 which is switched by N FET 64 which conducts the source current 61 and discharge capacitor 62 with a current equal in magnitude to that which charged it. The capacitor voltage limits are determined by a pair of FET's 65 and 66 acting as comparators. A P FET 65 senses when capacitor 62 reaches one threshold voltage from +V and turns an output flip-flop 67 on. An N FET 66 senses when the capacitor is charged to within one threshold voltage of $V_{reg}$ and clears flip-flop 67. Flip-flop 67 controls whether the current source 61 and 63 are charging or discharging capacitor 62. The output of flip-flop 67 is the output of oscillator 60 on line 6.

Flip-flop 67 is composed of an N FET 68 and a P FET 69 connected in a feedback configuration. The comparator P FET 65 controls a double constant current source 56 and is normally conducting. This circuit is in parallel with the gate of the latch P FET 69. If flip-flop 67 is not latched (not conducting), the release of the comparator P FET 65 allows the gate of the latch P FET 69 to be pulled on by the constant current source at $V_{reg}$. The comparator N FET 66 is in series with the latch N FET 68 and is normally also conducting. When N FET 68 opens the flip-flop is released.

Because the voltage on capacitor 62 swings to within one threshold voltage of the supply, and because the voltage regulator 50 normally regulates at the sum of the N FET and P FET gate threshold voltages, the oscillator 60 relies more on the analog rather than digital switching operation of the comparator FET's 65 and 66.

Figure 7:
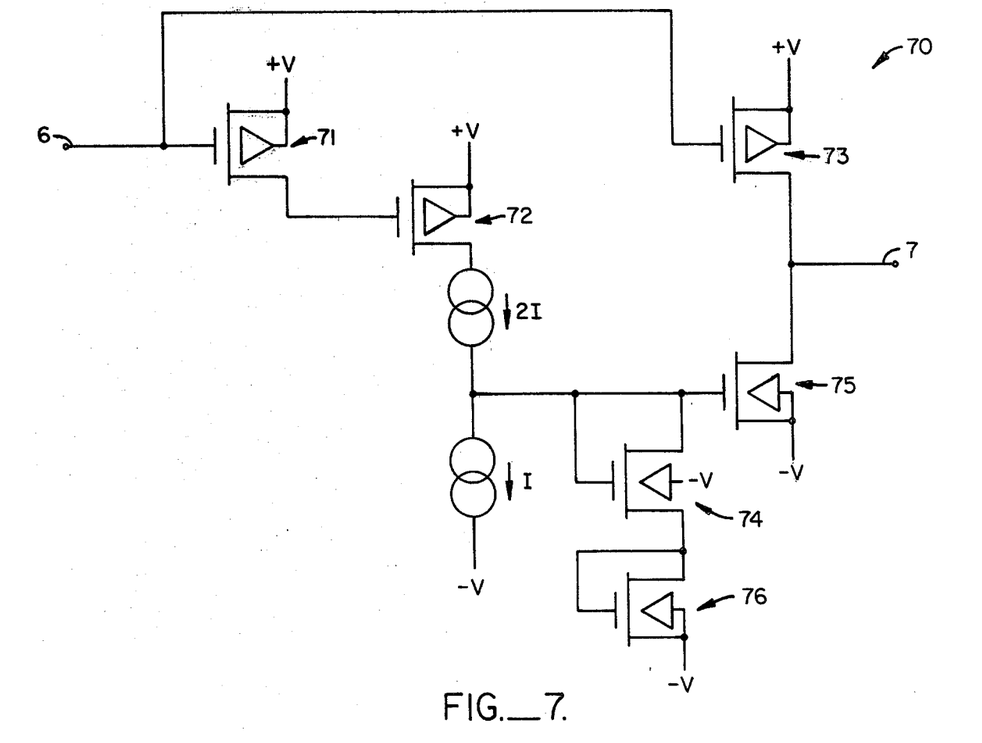
FIG. 7 is a more detailed schematic of the level shifter 70 shown in FIG. 1.

A more detailed schematic showing level shifter 70 appears as FIG. 7. Level shifter 70 is used to convert the oscillator output on line 6 from the regulated voltage level to the unregulated voltage level necessary to drive the digital circuitry. Level shifter 70 consists of a push-pull output composed of FET's 73 and 75, driven by a level converter from the oscillator output on line 6. The output pull up device 73 is in parallel with the P FET 69 in the oscillator latch. A constant current charge/discharge circuit connected to FET 72, and driven by the output of the oscillator 60, does the level shifting and applies signals to the gate of the output N FET 75. Two N FET's 74 and 76 are wired as a voltage clamp to prohibit the level shifted voltage from ever being more than two threshold voltages higher than −V. Therefore, a constant discharge time for the gate of the "Output Pull Down" N FET 75 is maintained regardless of variations in the supply voltage. Analog switches 77 and 78 (shown in FIG. 1) allow bypassing level shifter 70 and permit use of an external oscillator if desired. Inverters 100 and 101 (shown in FIG. 1) receive the output signal from level shifter 70 and can act as a "two-inverter" oscillator to generate a clock signal on line 8 for use by the digital portion of the transponder when the internal oscillator is disconnected from their input terminals. Other types of external oscillators may also be used.

Figure 8A:
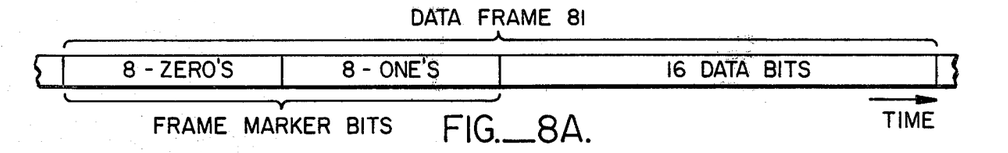
FIGS. 8A and 8B are a schematic representation showing the data encoding format used by the transponder shown in FIG. 1.
Figure 8B:
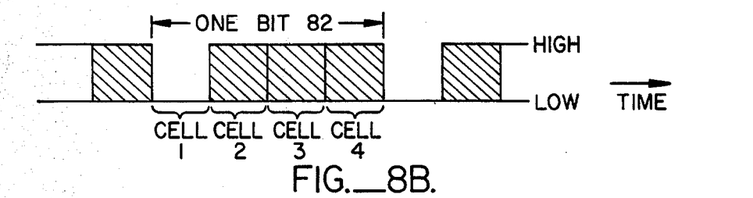
Figure 9:
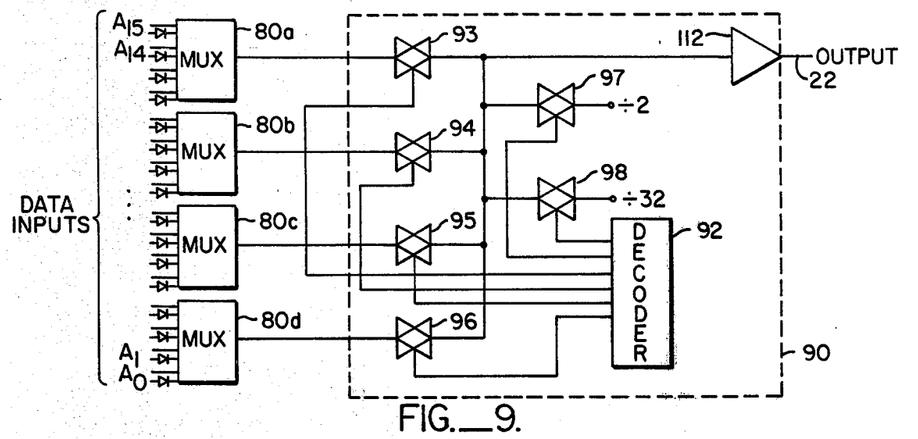
FIG. 9 is a more detailed schematic of the multiplexer and encoder 90 shown in FIG. 1.

The digital section of the block diagram shown in FIG. 1 is explained in additional detail in conjunction with FIGS. 8A, 8B and 9. The digital section is comprised of a 6-stage counter 110 and a 16-bit multiplexer and encoder comprised of multiplexers 80a, 80b, 80c, 80d, and multiplexer and encoder 90. In other embodiments shift registers or other known techniques may be used to select the inputs.

The data encoding format used in the digital section in the preferred embodiment is shown in FIGS. 8A and 8B. The encoding format shown in FIGS. 8A and 8B allows the encoded signal to be transmitted over a single radio frequency channel. The output of the digital section consists of an endless repetition of identical data frames 81 as shown in FIG. 8A. Each data frame contains 16 frame marker bits followed by 16 data bits. The 16 frame marker bits are 8 zeros followed by 8 ones. A single data frame 81 is shown in FIG. 8A. A single data bit 82 from frame 81 is shown in FIG. 8B. Cells 1 and 3 of data bit 82 are fixed at low and high levels, respectively. Cells 2 and 4 comprise the bit information and are both low for zero and both high for a one. As shown in FIG. 8B, data bit 82 contains a one.

Error correction can be achieved in the receiver which receives the signal transmitted from the transponder antenna 2 by comparing multiple received data frames 81. Error detection and correction can be further enhanced by utilizing some of the data bits for this purpose. The temperature information, or other analog information as desired, is encoded at the cell rate of the transmitted data. The encoding format shown in FIGS. 8A and 8B makes the transmitted data self clocking, that is, each bit has a rising and a falling edge. Further, because of the frame marker bits, the data is self aligning.

The digital section of the transponder shown in FIG. 1 operates in the following way. The six stage counter 110, in response to the clock signal supplied on line 8 from the two inverter oscillator 100 and 101 generates outputs having clock frequencies equal to the incoming signal frequency divided by 2, 4, 8, 16, 32, and 64. A synchronous counter is used to eliminate propagation problems at low voltages. Lower voltage operation is also enhanced by increasing the hold time of the counter latches. Every total count of divide by 64 results in one data frame being transmitted from the transponder. The first half of the 64 counts, as controlled by the divide by 32 signal on line 16, the eight zeros and eight ones, which comprise the first half of the data frame 81, are transmitted. The oscillator output signal is used to control the multiplexer 90 to switch between divide by 2 and data cells in a given data bit. The oscillator output frequency on line 8 is also supplied to multiplexer 90 to switch the data bit onto the output line 22 from multiplexer 90.

The four 1 of 4 multiplexers 80a, 80b, 80c and 80d are used to supply identity information to multiplexer 90. Identity information results from shorting one or more pins A0 through A15 to ground to create a unique identification code for the particular transponder involved. When the inputs are not shorted a constant current pull up forces a high level on these inputs. The use of 16 pins permits $2^{16}$ identity codes. If more identity codes are desired additional multiplexers 80 may be used with an enlarged encoder 90. The divide by 16 signal on line 15 from counter 110 and the divide by 32 signal on line 16 from counter 110 are used to control which of the signals from multiplexers 80a through 80d, connected by lines 18 through 21, respectively, is supplied to multiplexer 90. A more detailed view of multiplexer 90 is shown in FIG. 9, showing how a 1 of 4 decoder 92 controls four analog switches 93 through 96. Analog switches are used to minimize propagation delays at low voltages and to reduce the number of input gates required. The output from multiplexer 90 is supplied to a tristate output driver 112 which in turn supplies RF signal processor 30 via line 22. If an inverted signal is desired, the output driver 112 may be an inverter.

As shown in FIG. 2 the signal on line 22 is supplied to a modulation diode 34 which generates a second harmonic of the signal supplied on line 22. Diode 34 also rectifies some of the power supplied to the circuit on line 3 from antenna 2 and supplies this power as a voltage difference between line 22 and ground. The output from multiplexer 90 will typically have two states, a low state which is close to ground and a higher state designated $V_{CC}$. The output from multiplexer 90 is modulated between zero and $V_{CC}$ supplied to diode 34. The modulation between zero and $V_{CC}$ is used to convey information back to the antenna 2 for transmission to a remote receiver, typically at the same location as the transmitter which supplied signal 1 to antenna 2. Inductor 36 functions to provide a $V_{CC}$ return path for the signal.

To measure when the synchronous counter 110 is not operating correctly a reset control 130 is connected as shown in FIG. 1. Reset control 130 compares the output of the first counter stage supplied to it on line 10 with an independent divide by 2 counter stage 132. If the counter stage in counter 110 does not count by half-way through one oscillation of the clock then counters 110 and 132 are reset by a signal supplied on line 9. Because the counter stages within counter 110 operate at a lower voltage than counter 132 the reset control 130 eliminates any chance of counter 110 supplying an erroneous signal to multiplexer 90.

As noted above, inverters 100 and 101 can be set to comprise a two inverter oscillator which could be used to supply a clock signal on line 8 to counter 110. The analog section of the transponder may be disconnected from the digital portion and the inverter oscillator by opening switch 78. A clock signal for the digital portion of the transponder is then generated by connecting an external resistor-capacitor oscillator to the two inverters. In the embodiment shown, a thermistor is used as reference resistor 45. The analog section is sensitive to temperature because variations in temperature change the conductivity of the thermistor 45. Thus, changes in temperature change the reference current which in turn changes the frequency of oscillation of oscillator 60. The square law behavior of the $I_{in}$ voltage with respect to $I_{in}$ current tends to compensate for the exponential temperature characteristics of the thermistor and produce a linear change in reference current (and frequency) with respect to temperature. The frequency may be calibrated by connecting an external capacitor of desired size to oscillator 60 and adjusting the resistance of thermistor 45.

Figure 10:
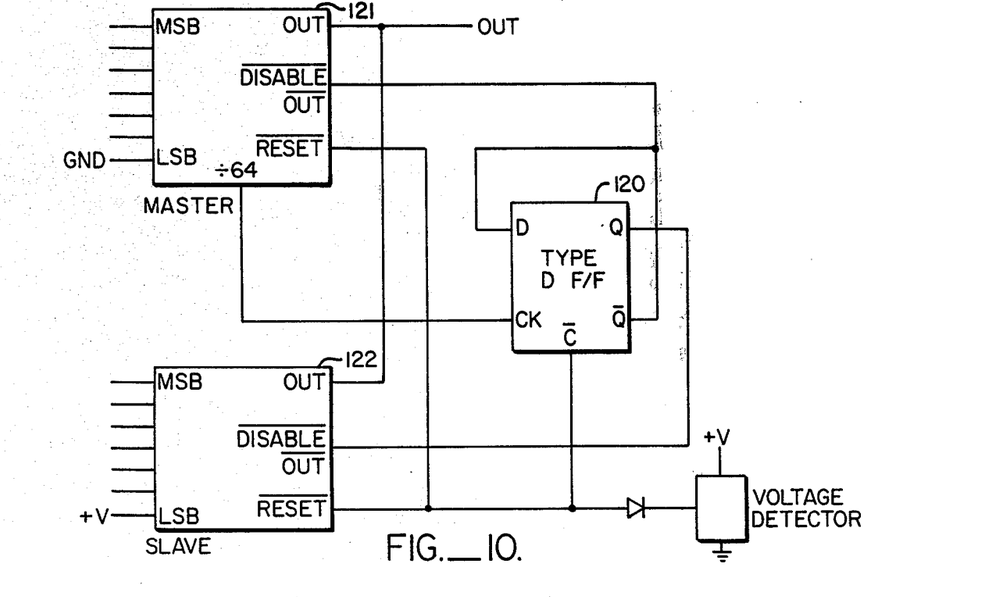
FIG. 10 illustrates one technique for interconnecting more than one series of multiplexers to generate identification codes in larger systems.

In certain applications where more than $2^{16}$ bits of identity information are desired, two digital circuits as shown in FIG. 1 may be connected together in the manner depicted in FIG. 10. By using an external flip-flop 120 it is possible to encode 30 bits of binary information on a single output stream. One of the transponder circuits 121 will act as the master and provide a clock input for slave transponder circuit 122. The divide by 64 output of the master transponder 121 drives flip-flop 120 which is wired as a counter. The counter output alternately enables the master 121 tri-state output while disabling the output of transponder 122. Subsequently flip-flop 120 enables slave 122 while disabling master 121. A schematic of this operation is shown in FIG. 10. An external reset control is used to enable the circuit when the supply voltage is large enough for the external flip-flop to operate.

The multiplexers 80 of the passive transponder of this invention may be readily programmed with the desired identification code in several ways. For example, in the preferred embodiment wherein the circuits are embodied in integrated form, a fusible bonding wire may connect each appropriate integrated circuit package lead to the conducting die attach area adjacent the chip. The normal bonding wire connects the package lead to the chip bonding pad.

By maintaining the substrate at a desired positive voltage +V a current will flow between the internal chip input current sink and the substrate. When the fusible lead is "blown" the internal input is pulled to the "default" state by the internal current source. Thus the difference between unblown and blown fusible wire is interpreted by the multiplexers 80 as high and low inputs. This scheme still permits later changes in the identification code even with the blown fused wires by forcing the package lead high or low as desired.

Further by connecting a diode between the chip die attach and the package lead in parallel with a fused bonding wire, used instead of the normal bonding wire, fusible programming may also be effected. After the desired fusible wires are blown by application of an externally generated current, all of the package leads are connected to ground. Unblown wires will shunt the pull-up current and produce low inputs while blown wires allow the input pull-ups to create logic high states on those wires. After programming the diode is reverse biased thereby not affecting the inputs operation.

Although the foregoing invention has been described in some detail by way of illustration and example for clarity, it is obvious that certain changes and modifications may be made within the scope of the appended claims. For example, variables other than temperature may be sensed and encoded for transmission. Or a shift register may be employed in place of the multiplexers. Other variations will also be apparent.

I claim:

1. A passive transponder comprising:
   antenna means for receiving and transmitting signals;
   oscillating means for generating a signal of a first frequency in response to signal received by the antenna means;
   counting means connected to receive the signal from the oscillating means and to provide output signals at selected frequencies integrally divisible into the first frequency;
   at least one multiplexing sequencing means having a series of input terminals, selected ones of which are altered to provide an identification code, the at least one multiplexing sequencing means being connected to receive signals from the counting means and the oscillating means;
   encoding mens connected to the oscillating means, the counting means, the at least one multiplexing sequencing means, and the antenna for selecting which of the signals from the oscillating means, the counting means, and the at least one multiplexing means shall be supplied to the antenna; and
   reset means coupled to the counting means for sensing the signals received by the antenna means and inhibiting the operation of the passive transponder until the signals being received by the antenna means possess sufficent energy to operate the passive transponder.

2. A passive transponder as in claim 1 further including circuit means for changing the frequency of the oscillating means in relation to at least one measurable parameter of interest.

3. A passive transponder as in claim 2 wherein the circuit means comprises a temperature sensitive thermistor.

4. A passive transponder as in claim 2 wherein said circuit means comprises a current sensitive oscillator.

5. A passive transponder as in claim 1 wherein the reset means includes:
   additional counting means connected to the counting means and to receive the signal from the oscillating means and to provide an output signal at a frequency integrally divisible into the first frequency; and
   comparison means for comparing the output signal from the additional counting means with at least one of the output signals from the counting means to thereby determine when the counting means is functioning correctly and to reset the counting means if it is not functioning correctly.

6. A passive transponder as in claim 5 wherein the additional counting means comprises a divide by 2 counter.

7. A passive transponder as in claim 6 wherein the comparison means comprises a comparator for comparing the signal from the counting means with a signal from the additional counting means.

8. A passive transponder as in claim 1 including RF signal processing means connected between the antenna and the encoding means to double the frequency of the signal received by the antenna means.

9. A passive transponder as in claim 1 wherein the counting means comprises a counter.

10. A passive transponder as in claim 9 wherein the counter is a synchronous counter.

11. A passive transponder as in claim 9 wherein the at least one multiplexing sequencing means comprises at least one multiplexer.

12. A passive transponder as in claim 9 wherein the at least one multiplexing sequencing means comprises at least one shift register.

13. A passive transponder as in claim 1, wherein the at least one multiplexing sequencing means comprises:
   at least one multiplexer having a series of input terminals, each input terminal being adapted to be connected to a first voltage level to thereby provide a first level input signal; and
   fusible connecting means connected between each input terminal of the at least one multiplexer and a second voltage level.

14. A passive transponder as in claim 13 wherein a diode is connected in parallel with each fusable connecting means.

15. A passive transponder comprising:
   antenna means for receiving and transmitting signals;

impedance matching means for matching the impedance of the antenna means with that of an oscillating means, the oscillating means for generating a signal of a first frequency in response to signal received by the antenna means;

counting means connected to receive the signal from the oscillating means and to provide output signals at selected frequencies integrally divisible into the first frequency;

at least one multiplexing sequencing means having a series of input terminals, selected ones of which are altered to provide an identification code, the at least one multiplexing sequencing means being connected to receive signals from the counting means and the oscillating means;

encoding means connected to the oscillating means, the counting means, the at least one multiplexing sequencing means, and the antenna for selecting which of the signals from the oscillting means, the counting means, and the at least one multiplexing means shall be supplied to the antenna; and reset means coupled to the counting means for sensing the signals received by the antenna means and inhibiting the operation of the passive transponder until the signals being received by the antenna means posses sufficient energy to operate the transponder, the reset means including;

additional counting means connected to the counting means and to receive the signal from the oscillating means and to provide an output signal at a frequency integrally divisible into the first frequency; and comparison means for comparing the output signal from the additional counting means with at least one of the output signals from the counting means to thereby determine when the counting means is functioning correctly and to reset the counting means if it is not functioning correctly.

* * * * *